Patented Mar. 7, 1939

2,149,520

UNITED STATES PATENT OFFICE 2,149,520

SYNTHETIC RESINS AND PROCESS OF MAKING SAME

Alphonse Gams and Karl Frey, Basel, Switzerland, assignors, by mesne assignments, to the firm of Ciba Products Corporation, Dover, Delaware No Drawing. Application October 16, 1929, Serial No. 400,154. In Switzerland November 7, 1928

10 Claims. (Cl. 260—72)

This invention relates to filled synthetic resins from aromatic amines and aldehydes. It comprises the process for the manufacture of these resins, the new products themselves, as well as the application of same in the synthetic resin industry.

In the copending specifications, Serial No. 245,039, filed Jan. 6, 1928, No. 398,267, filed Oct. 8, 1929, No. 389,268, filed Oct. 8, 1929, and No. 400,153, filed October 16, 1929, there has been described the manufacture of molded infusible synthetic resin which consists in subjecting an infusible or fusible condensation product, obtained by condensing a primary aromatic amine with formaldehyde in presence of an acid and subsequently eliminating the action of the acid, to molding, if necessary in presence of an aldehydic hardening agent.

According to the present invention similar products are made by treating Schiff's bases obtained by the condensation of equimolecular proportions of a primary aromatic amine and formaldehyde with a strong mineral acid, if necessary with addition of further quantities of an aldehyde or an agent yielding an aldehyde, and subjecting the product, after elimination of the acid and preferably after subsequent washing, drying and comminution, to moulding by pressure, if necessary with addition of a hardening agent and filling material.

The amount of acid used should preferably not be substantially less than approximately the equivalent of the Schiff's base used.

When a Schiff's base of the above defined character is treated with a strong mineral acid without further addition of formaldehyde or agent yielding an aldehyde, that is to say in a proportion of 1 mol. amine to 1 mol. aldehyde, there is obtained after elimination of the acid a fusible resin which in presence of a hardening agent is transformed into an infusible compressed body. For this hardening agent may be used an aldehyde or an agent yielding aldehyde, such as paraformaldehyde or hexamethylene-tetramine, or an aldehyde condensation product which is in itself capable of being hardened, for instance, a phenol aldehyde condensation product, a urea aldehyde condensation product, a thiourea aldehyde condensation product, a mixed urea thiourea aldehyde condensation product, or a condensation product from an aromatic amine and an aldehyde. Mixtures of the agents named may also be used.

When a Schiff's base of the above defined character is treated with a strong mineral acid with addition of an aldehyde or an agent yielding an aldehyde and the acid is subsequently eliminated, there is produced an infusible product which may be moulded under pressure. The moulding can be facilitated by the use of fluxing agents as described in specification No. 400,153, filed Oct. 16, 1929 (Pat. No. 2,002,601) or of a fusible resin made according to the present invention, whereby the temperature of compression and the time occupied by the moulding may be considerably diminished.

Before the moulding operation, the condensation product may be mixed with a filling material, a dyestuff, a softening agent, a catalyst, a resin, which may be natural or artificial and capable of being hardened or not; the properties of the finished moulded body may be affected in several directions by such addition. Such substances may be added before the elimination of the acid, that is to say, to the solution of the condensation product, or to the separate condensation components, or to their mixture, the condensation being then conducted to completion, or the additions may be made to the condensation products after the acid has been eliminated.

The invention produces according to the parent materials used and the conditions of manufacture, more or less transparent or translucent more or less coloured products, which have remarkable mechanical, chemical, and electrical resistance.

When the molding pressures and the temperatures are low, there are obtained opaque to translucent products the specific gravity of which may vary between 0.5 and 1; at higher pressures and higher temperatures, transparent products may be obtained the specific gravity of which amounts to 1.2 and more.

It is understood that the term "aldehyde" used in this specification and in the claims means also polymerization products of aldehydes, and further such condensation products of aldehydes which still possess reactive aldehydic groups, as for instance aldehyde-phenol-condensation products which are still capable of being hardened.

The following examples illustrate the invention, the parts being by weight:—

*Example 1*

105 parts of anhydroformaldehydeaniline (1 mol.) are suspended in 200 parts of water at 80–90° C. and the suspension is mixed with a solution at like temperature of 100 parts of hydrochloric acid of 37 per cent. strength (1 mol.) in 200 parts of water. After about 1 hour a deep red clear solution is produced which is then neutralized with dilute caustic soda solution. The precipitate thus produced is washed until free from electrolyte and then dried and comminuted. It is a fusible powder which, when mixed with 15 per cent. of paraformaldehyde, may be compressed at 150° C. into homogeneous infusible moulded pieces.

Example 2

105 parts of anhydroformaldehydeaniline (1 mol.) are suspended in 400 parts of water and the suspension is mixed with a solution of 100 parts of hydrochloric acid of 37 per cent. strength (1 mol.) and 30 parts of a solution of formaldehyde of 40 per cent. strength (0.38 mol.) in 300 parts of water. The deep red clear mixture is heated to 60° C. and after 10 minutes there is added a solution of 40 parts of sodium hydroxide in 1000 parts of water; the infusible precipitate thus produced is washed until free from electrolyte, dried and comminuted.

Instead of precipitating the condensation solution by means of caustic soda, the mass may be allowed to gelatinize then comminuted and treated for elimination of acid. The further treatment is as described above.

The moulding powder obtained can be compressed at about 120° C. under a pressure of 50 atmospheres, to form yellow non-transparent products, the resistance of which may be increased by a subsequent hardening at a higher temperature. If the temperature of compression is raised to 150° C. and the pressure to 180 atmospheres, clear translucent brown bodies of enhanced resistance are obtained. To the powder made as described in Examples 1 or 2 there may be added, before the moulding operation, a filling agent, a dyestuff, a softening agent, or the like.

Example 3

105 parts of anhydroformaldehydeaniline are suspended in 400 parts of water and the suspension is mixed with a solution of 100 parts of hydrochloric acid of 37 per cent. strength, and 30 parts of formaldehyde of 40 per cent. strength in 300 parts of water. 100 parts of wood meal are introduced into and thoroughly impregnated with the red mixture. After about 10 minutes the whole is neutralized with dilute caustic soda solution and the solid matter washed free from electrolytes, dried and comminuted. The powder thus obtained yields opaque homogeneous bodies by compression.

Example 4

100 parts of a moulding powder made as described in Example 2 are mixed with 5 parts of phenol. The mixture may be compressed at 120° C. to form homogeneous translucent and infusible moulded pieces.

The expression "formaldehyde yielding compounds" is employed herein because it has been found that instead of formaldehyde itself also its polymers or any other substance splitting off formaldehyde under the conditions of the condensation may be used.

What we claim is:—

1. A process of manufacturing molded infusible synthetic resins from condensation products of aromatic amines with aldehydes, by treating anhydroformaldehydeaniline with not substantially less than an equivalent proportion of an aniline salt-forming acid with respect to the anhydroformaldehydeaniline in dilute aqueous solution at moderate temperatures and with a formaldehyde yielding compound, eliminating the effect of the acid after reaction has taken place, and molding the resulting mass in a comminuted condition under pressure in excess of atmospheric.

2. A process of manufacturing molded infusible synthetic resins from condensation products of aromatic amines with aldehydes, by treating anhydroformaldehydeaniline with not substantially less than an equivalent proportion of an aniline salt-forming acid with respect to the anhydroformaldehydeaniline in dilute aqueous solution at moderate temperatures and with a formaldehyde yielding compound, eliminating the effect of the acid after reaction has taken place, and molding the resulting mass in a comminuted condition under pressure in excess of atmospheric.

3. A process of manufacturing molded infusible synthetic resins from condensation products of aromatic amines with aldehydes, by treating anhydroformaldehydeaniline with not substantially less than an equivalent proportion of an aniline salt-forming acid with respect to the anhydroformaldehydeaniline in dilute aqueous solution at moderate temperatures and with a formaldehyde yielding compound, eliminating the effect of the acid after reaction has taken place, and molding the resulting mass in a comminuted condition under pressure in excess of atmospheric.

4. A process of manufacturing molded infusible synthetic resins from condensation products of aromatic amines with aldehydes, by treating anhydroformaldehydeaniline with not substantially less than an equivalent proportion of an aniline salt-forming acid with respect to the anhydroformaldehydeaniline in dilute aqueous solution at moderate temperatures and with a formaldehyde yielding compound, eliminating the effect of the acid after reaction has taken place, and molding the resulting mass in a comminuted condition under pressure in excess of atmospheric.

5. A process for making a molding powder by treating anhydroformaldehydeaniline with not substantially less than an equivalent proportion of an aniline salt-forming acid with respect to the anhydroformaldehydeaniline in dilute aqueous solution at moderate temperatures and with a formaldehyde yielding compound, eliminating the effect of the acid after reaction has taken place, and molding the resulting mass in a comminuted condition under pressure in excess of atmospheric.

6. A process of manufacturing molded infusible synthetic resins from condensation products of aromatic amines with aldehydes, by treating anhydroformaldehydeaniline with not substantially less than an equivalent proportion of hydrochloric acid with respect to the anhydroformaldehydeaniline in dilute aqueous solution at moderate temperatures and with a formaldehyde yielding compound, eliminating the effect of the acid after reaction has taken place, and molding the resulting mass in a comminuted condition under pressure in excess of atmospheric.

7. A process of manufacturing molded infusible synthetic resins from condensation products of aromatic amines with aldehydes, by treating anhydroformaldehydeaniline with not substantially less than an equivalent proportion of hydrochloric acid with respect to the anhydroformaldehydeaniline in dilute aqueous solution at moderate temperatures, eliminating the effect of the acid after reaction has taken place, adding a formaldehyde compound, and molding the resulting mixture in a comminuted condition under pressure in excess of atmospheric.

8. A process of manufacturing molded infusible synthetic resins from condensation products or aromatic amines with aldehydes, by treating anhydroformaldehydeaniline with not substantially less than an equivalent proportion of hydrochloric acid with respect to the anhydroformaldehydeaniline in dilute aqueous solution at moderate temperatures and with formaldehyde, eliminating the effect of the acid after reaction has taken place, and molding the resulting mass in a comminuted condition under pressure in excess of atmospheric.

9. A process of manufacturing molded infusible synthetic resins from condensation products of aromatic amines with aldehydes, by treating anhydroformaldehydeaniline with not substantially less than an equivalent proportion of hydrochloric acid with respect to the anhydroformaldehydeaniline in dilute aqueous solution at moderate temperatures, eliminating the effect of the acid after reaction has taken place, adding formaldehyde, and molding the resulting mixture in a comminuted condition under pressure in excess of atmospheric.

10. A process for making a molding powder by condensing anhydroformaldehydeaniline with formaldehyde in presence of not substantially less than an equivalent proportion of hydrochloric acid with respect to the anhydroformaldehydeaniline in dilute aqueous solution at moderate temperatures and subsequently eliminating the effect of the acid.

ALPHONSE GAMS.
KARL FREY.